(12) United States Patent
Lin et al.

(10) Patent No.: US 8,425,818 B2
(45) Date of Patent: Apr. 23, 2013

(54) UNDERWATER PELLETIZING MACHINE AND METHOD OF EXTRUDING FOAMED THERMOPLASTIC PELLETS

(75) Inventors: Yi An Lin, Sinjhuang (TW); Ming-Tsai Liang, Kaohsiung (TW)

(73) Assignee: Interplast Group Ltd., Livingston, NJ (US)

( * ) Notice: Subject to any disclaimer, the term of this patent is extended or adjusted under 35 U.S.C. 154(b) by 805 days.

(21) Appl. No.: 12/129,312

(22) Filed: May 29, 2008

(65) Prior Publication Data

US 2008/0296794 A1 Dec. 4, 2008

(30) Foreign Application Priority Data

May 29, 2007 (TW) .............................. 96208755 U

(51) Int. Cl.
*B29B 9/02* (2006.01)

(52) U.S. Cl.
USPC ............... 264/141; 264/41; 264/46; 264/142; 425/DIG. 101; 408/130; 415/73; 416/91; 416/177; 416/248; 83/401; 83/631; 451/178

(58) Field of Classification Search .................... 264/41, 264/141, 46.1, 142; 425/DIG. 101; 408/130; 415/73; 416/91, 177, 248; 83/401, 631; 451/178

See application file for complete search history.

(56) References Cited

U.S. PATENT DOCUMENTS

| 3,676,029 | A | * | 7/1972 | Hopkin | ........................... 425/67 |
| 3,688,502 | A | * | 9/1972 | Hasen et al. | .................... 60/670 |
| 3,874,835 | A | * | 4/1975 | Rossiter et al. | ............... 425/306 |
| 7,118,362 | B2 | | 10/2006 | Lee et al. | |

FOREIGN PATENT DOCUMENTS

| TW | I269698 | * | 1/2007 |
| TW | 325201 | | 1/2008 |

* cited by examiner

*Primary Examiner* — Katarzyna Wyrozebski Lee
*Assistant Examiner* — Joshel Rivera
(74) *Attorney, Agent, or Firm* — Senniger Powers LLP

(57) ABSTRACT

A pelletizing machine for forming pellets from extruded material includes an extruder having at least one exit port and a body defining a cutting chamber through which high-temperature liquid flows, flooding the cutting chamber. The exit port of the extruder opens into the cutting chamber, which includes a cutting section defining a flow path for liquid through the cutting section. A cutter in the cutting section of the cutting chamber is mounted for rotation about an axis generally perpendicular to the first direction and disposed for cutting the extruded material exiting the exit port into the pellets. The axis of rotation of the cutter is parallel to or coincident with the flow path of the cutting section. A method for forming pellets of thermoplastic material with a foaming agent is also disclosed.

8 Claims, 14 Drawing Sheets

UNDERWATER PELLETIZING MACHINE AND METHOD OF EXTRUDING FOAMED THERMOPLASTIC PELLETS

BACKGROUND OF THE INVENTION

1. Field of the Invention

The present invention relates to an underwater pelletizing machine and method of extruding foamed thermoplastic pellets.

2. Background of the Invention

Conventionally, the foamed thermoplastic pellets are made in a batch process. First, the foaming agents and thermoplastic materials are put in a container under a high temperature and high pressure environment (e.g., an autoclave). Then the mixture is released into a foaming chamber to form foamed thermoplastic pellets. However, during the manufacturing process, a high pressure is necessary for the foaming agent. A high-pressure container necessary to manufacturing is expensive and greatly increases manufacturing costs. The volume of the thermoplastic materials expands tens of times into foamed thermoplastic pellets, therefore a very large container is necessary to collect the foamed thermoplastic pellets. In addition, the suspension and dispersion of the thermoplastic materials in a fluid further hinders the penetration of foaming agent, which is in gas phase, into the thermoplastic material. This reduces the production capacity of the equipment after long-term operation. The conventional production method not only has high production cost but also has low production efficiency. Therefore, the price of products from foamed thermoplastic material is relatively high. Due to the high cost, the applications of products from foamed thermoplastic materials are limited and can not be broadly utilized.

In view of the problems of the aforementioned prior art, a method of continuously manufacturing foamed pellets was developed, as described in Taiwan Patent No. I269698. The method of extruding foamed thermoplastic pellets includes a thermoplastic material, a foaming agent, an extruder, a high-pressure underwater pelletizing machine, a high-pressure tube, a foaming chamber, a separation device, and a storage tank. The thermoplastic material is first uniformly mixed with the foaming agent in the extruder. The molten thermoplastic material containing the foaming agent is extruded by the extruder to the high-pressure underwater pelletizing machine, which cuts the thermoplastic material into a plurality of small cylinders. A high-pressure tubes containing high-temperature liquid then transports the cylinders of the thermoplastic material away from the underwater pelletizing machine. In the transportation process, the thermoplastic cylinders, which are in molten state, gradually transform into small spheres because of the surface tension of the thermoplastic materials The high-pressure tube is connected to a foaming chamber. The foaming chamber has a temperature-control device to regulate the temperature of the thermoplastic material entering the foaming chamber from the high-pressure tube. There is a nozzle (a "pressure drop device") connecting the high-pressure tube to the foaming chamber. The molten thermoplastic material and high temperature transportation liquid are injected into the foaming chamber through the nozzle. A pressure drop occurs through the nozzle, which induces the foaming process. When the molten thermoplastic material is released into the foaming chamber, the thermoplastic material is cooled down by the lower temperature regulated by the temperature-control device of the foaming chamber to form thermoplastic pellets. The high temperature transportation liquid turns into steam when injected through the nozzle into the foaming chamber. The steam is condensed by a condenser installed with the temperature-controlled device of the foaming chamber. The steam includes unused foaming agent. When the steam is condensed, the unused foaming agent can be collected in the foaming agent recycle tank.

In addition, there is low-pressure tube connected to the foaming chamber. The low-pressure tube is connected back to the underwater pelletizing machine. A temperature-controlled device regulates the temperature in the low-pressure tube. The low-pressure tube moves the low temperature liquid from the foaming chamber back to the underwater pelletizing machine of the extruder. There is another duct connected to the foaming chamber. The thermoplastic pellets are carried by the flow of the low-temperature liquid to the separating unit out of the foaming chamber, which separates and moves the thermoplastic pellets into a foamed thermoplastic pellets storage tank. The low-temperature carrying liquid separated from the thermoplastic pellets in the separating unit is later transported back to foaming chamber through a transportation tube.

The underwater pelletizing machine includes a cutter driven by a motor that cuts extruded strands of thermoplastic material (including the foaming agent) into pellets (i.e., the cutter pelletizes the extruded thermoplastic. The cutter is located in a chamber into which the thermoplastic material is extruded. However, the rotation of the cutter, which is oriented generally perpendicular to the flow of fluid through the chamber, causes substantial turbulence that can interfere with the granulation process.

SUMMARY OF THE INVENTION

In one aspect of the present invention, a pelletizing machine for forming pellets from extruded material generally comprises an extruder having at least one exit port, and a body defining a cutting chamber. The exit port of the extruder opens into the cutting chamber, which includes an inlet for passage of liquid into the cutting chamber and an outlet for passage of liquid and pellets out of the cutting chamber. The cutting chamber further includes a cutting section defining a flow path for liquid through the cutting section. A cutter in the cutting section of the cutting chamber is mounted for rotation about an axis generally perpendicular to the first direction and disposed for cutting the extruded material exiting the exit port into the pellets. The axis of rotation of the cutter is parallel to or coincident with the flow path of the cutting section.

In another aspect of the present invention, a method of extruding foamed thermoplastic plastic pellets generally comprises a step of uniformly mixing thermoplastic material and foaming agent. The thermoplastic material mixed with the foaming agent is extruded to a pelletizing machine. High temperature liquid is forced over a cutter rotatable about an axis of rotation parallel to or coincident with a flow path of the liquid over the cutter. Extruded thermoplastic material mixed with the foaming agent is cut into pellets by rotation of the cutter; and the thermoplastic pellets are transported out of the pelletizing machine using the high-temperature liquid.

BRIEF DESCRIPTION OF THE DRAWINGS

The invention may be best understood by reference to the following description taken in conjunction with accompanying drawings, wherein like reference numerals identify like elements and wherein.

DETAILED DESCRIPTION OF THE DRAWINGS

Figure 1:
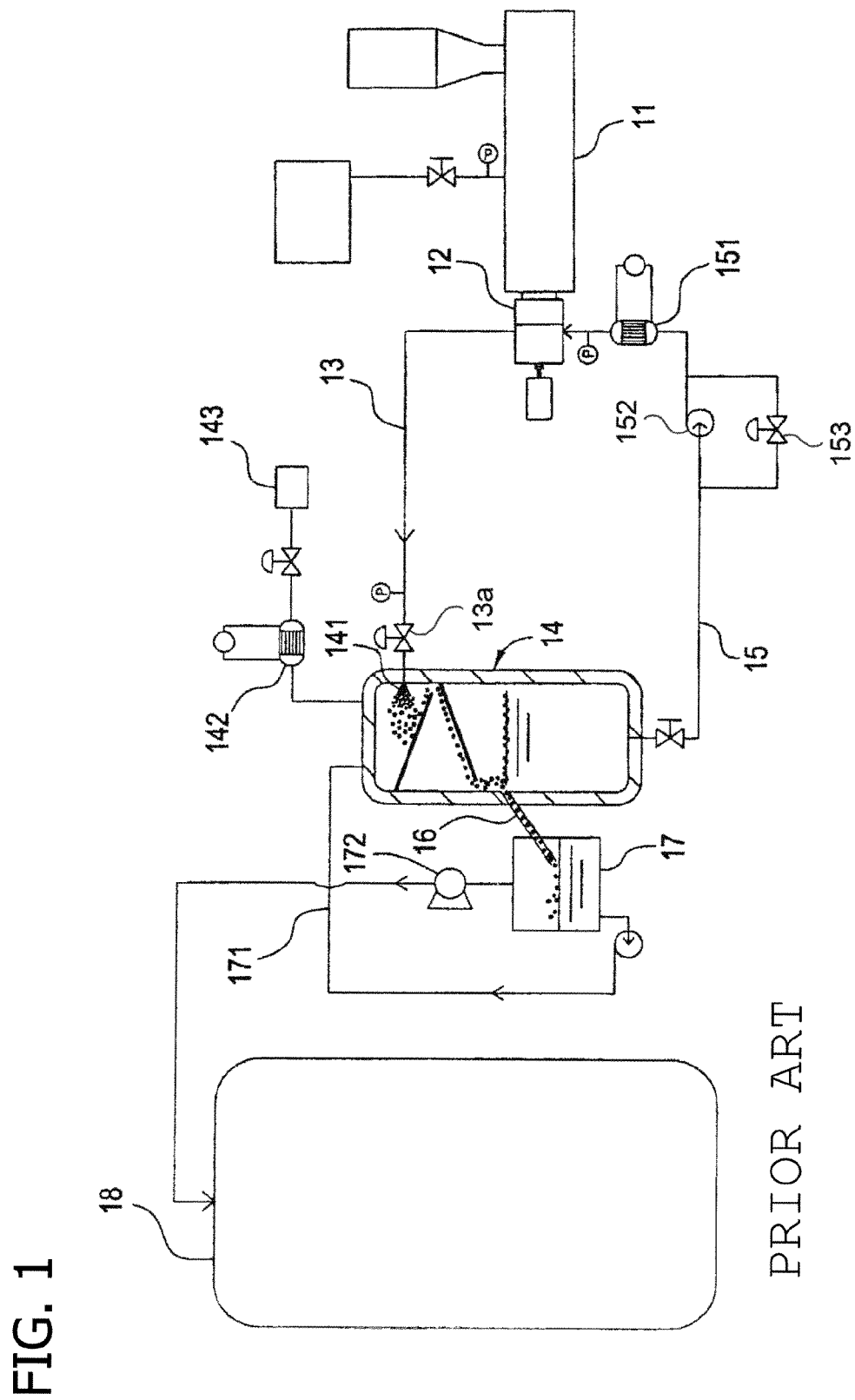
FIG. 1 is a schematic of a prior art system for extruding foamed thermoplastic pellets.
Figure 3:
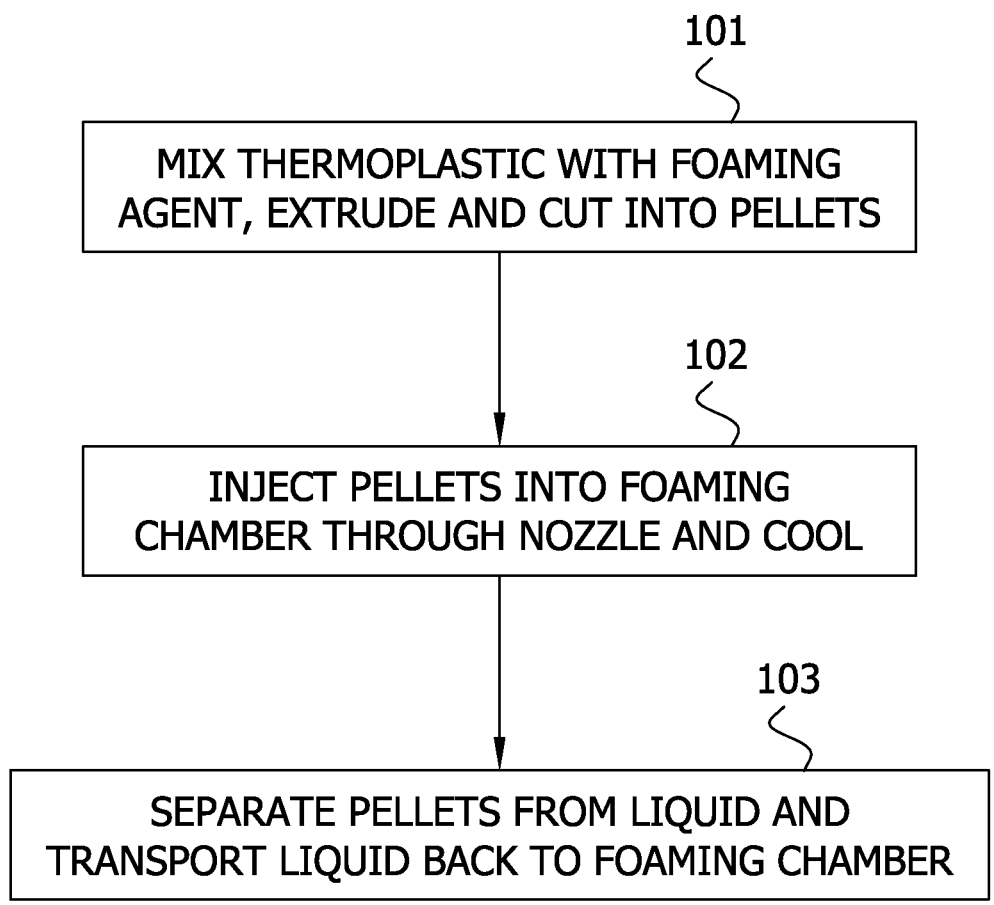
FIG. 3 is a flow chart of a method of extruding foamed thermoplastic pellets of the present invention.
Figure 4:
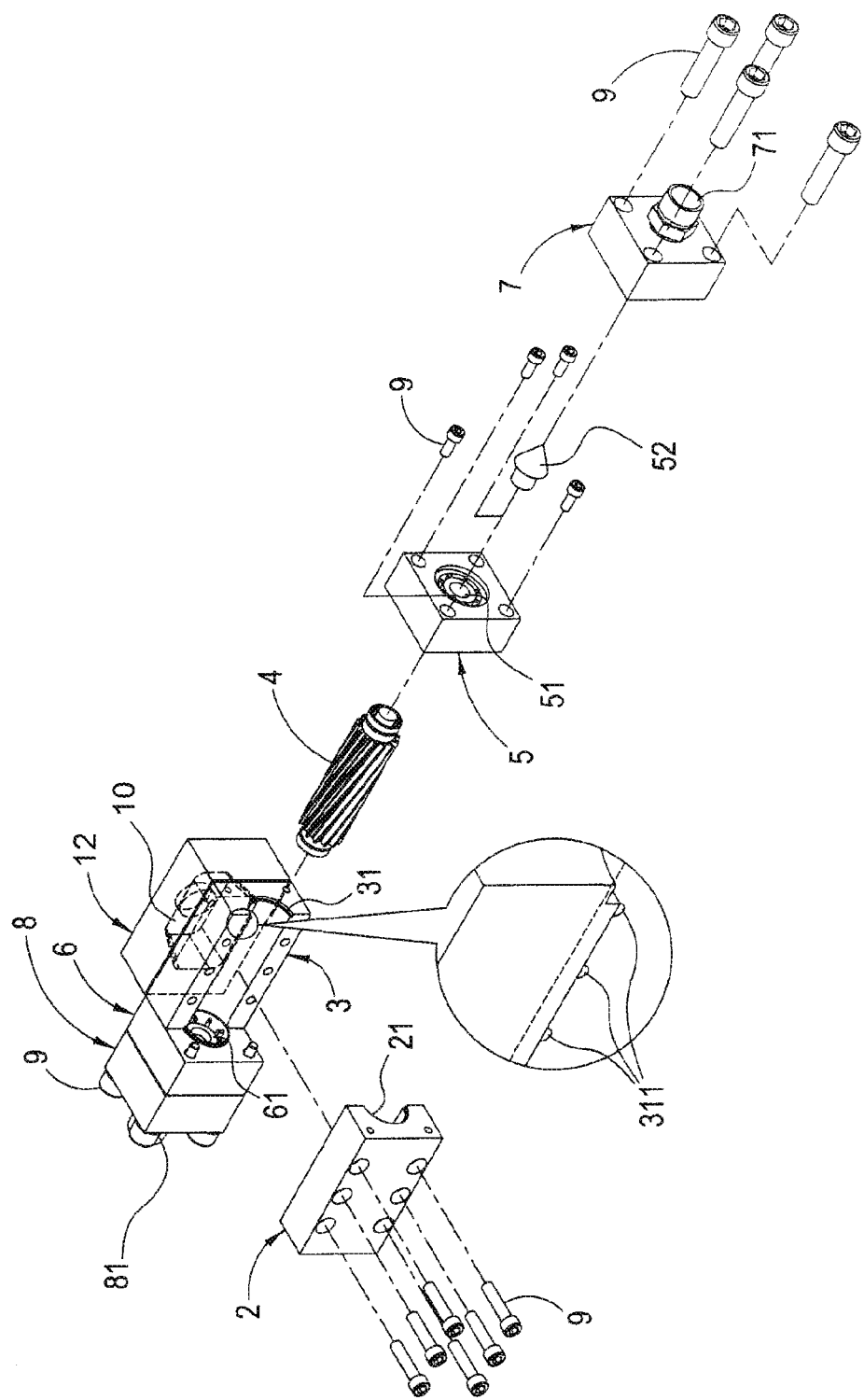
FIG. 4 is a partially exploded perspective view of an underwater pelletizing machine of the present invention for extruding foamed thermoplastic pellets.
Figure 5:
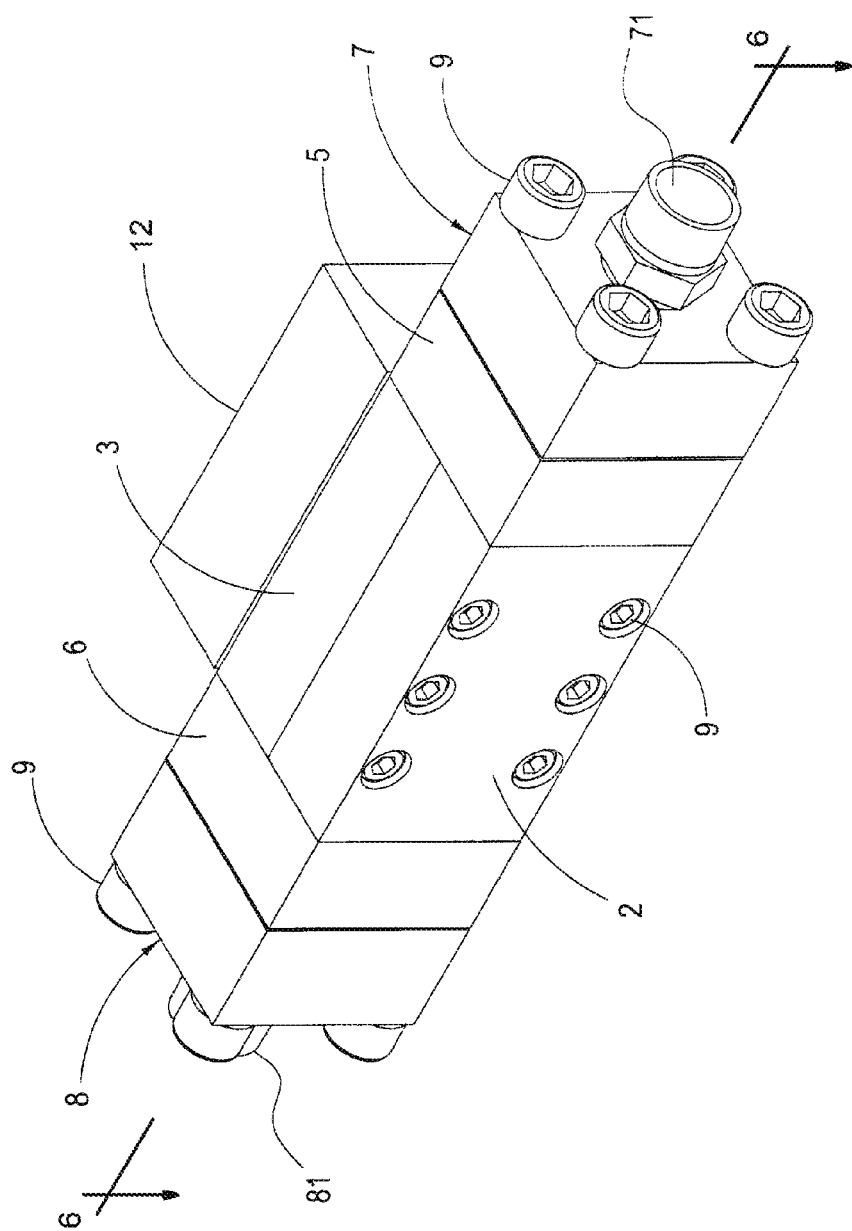
FIG. 5 is an assembled perspective view of the assembled improved underwater pelletizing machine.

FIG. 1 shows a prior art system for extruding foamed thermoplastic pellets. Referring to FIG. 3, the method of extruding foamed thermoplastic pellets of the present invention comprises the following steps.

Step I, 101: Mix uniformly thermoplastic material and blowing agents in an extruder 11. Extrude the molten thermoplastic material containing the blowing agent to a high-pressure underwater pelletizing machine 12 that is connected to a high-pressure tube 13. The high-pressure underwater pelletizing machine 12 (described in more detail hereinafter) continuously converts the thermoplastic material into a plurality of small thermoplastic cylinders, which are transported to the high-pressure tube 13 containing high temperature liquid. The high-pressure tube 13 can sustain the high temperature liquid. The liquid may be water or other suitable liquid.

Step II, 102: The high-pressure tube 13 connects the high-pressure underwater pelletizing machine 12 to a foaming chamber 14 (broadly, "a container"). A pressure drop device or nozzle 141 in the end of high-pressure tube 13 connects to foaming chamber 14. The molten thermoplastic material is released to the foaming chamber 14 through the nozzle 141 and cooled down by the first temperature control device 142 externally connected to the foaming chamber 14 to form thermoplastic pellets. The thermoplastic pellets manufactured are first-staged foamed materials. The high temperature liquid is released to the foaming chamber 14 along with the thermoplastic pellets carried by the liquid, and phase changes to steam. The steam of the high-temperature liquid is cooled down and condensed by the first temperature control device 142. Some of the foaming agent from the pellets will be released into the steam. Unused foaming agent in the steam can be collected in the recycling tank 143 externally attached to the first temperature control device 142. The first temperature control device 142 can condense the steam into liquid and partially recycle the foaming agent by collecting in the recycling tank 143. If the temperature is lower than the softening point of the thermoplastic material, non-foamed pellets, which have the capability to be foamed, could be obtained. The bottom of the foaming chamber 14 has a low-pressure tube 15, which is connected back to the high-pressure underwater pelletizing machine 12 in order to transport the low temperature liquid in foaming chamber 14 back to high-pressure underwater pelletizing machine 12. A pump 152 and back pressure regulator 153 in line with the tube 15 are used to increase and control the pressure of the water heading back to the pelletizing machine 12. A heating device 151 downstream from the pump 152 in the low-pressure tube 15 heats up the liquid before entering high-pressure underwater pelletizing machine 12.

Step III, 103: A transportation duct 16 is connected to the top of foaming chamber 14. The thermoplastic pellets in the foaming chamber 14 are continuously affected by the flow of the low-temperature liquid and are transported from the foaming chamber 14 to the separation unit 17 via transportation duct 16. These are second-staged thermoplastic pellets, which internally contain some foaming agent that can increase the internal pressure of thermoplastic pellets to help the subsequent product forming. The thermoplastic pellets separated in separation unit 17 are moved to storage tank 18. A tube 171 connected to separation unit 17 transports the low temperature liquid in separation unit 17 to foaming chamber 14. A blower 172 is externally connected to the separation unit 17 to help transport the foamed pellets into the storage tank 18. Normally the pressure of the foaming chamber 14 is set to ambient. In another embodiment, the pressure of the foaming chamber 14 may be increased by a pressure control device (not shown), or by placing a back pressure regulator (not shown) between first temperature control device 142 and recycling tank 143. The amount of foaming agent in the thermoplastic pellets can be controlled by controlling the pressure drop across the nozzle 141. In that regard, pressure in the high pressure tube 13 can be regulated by a back pressure valve 13a for controlling the pressure drop across the nozzle 141.

Figure 2:
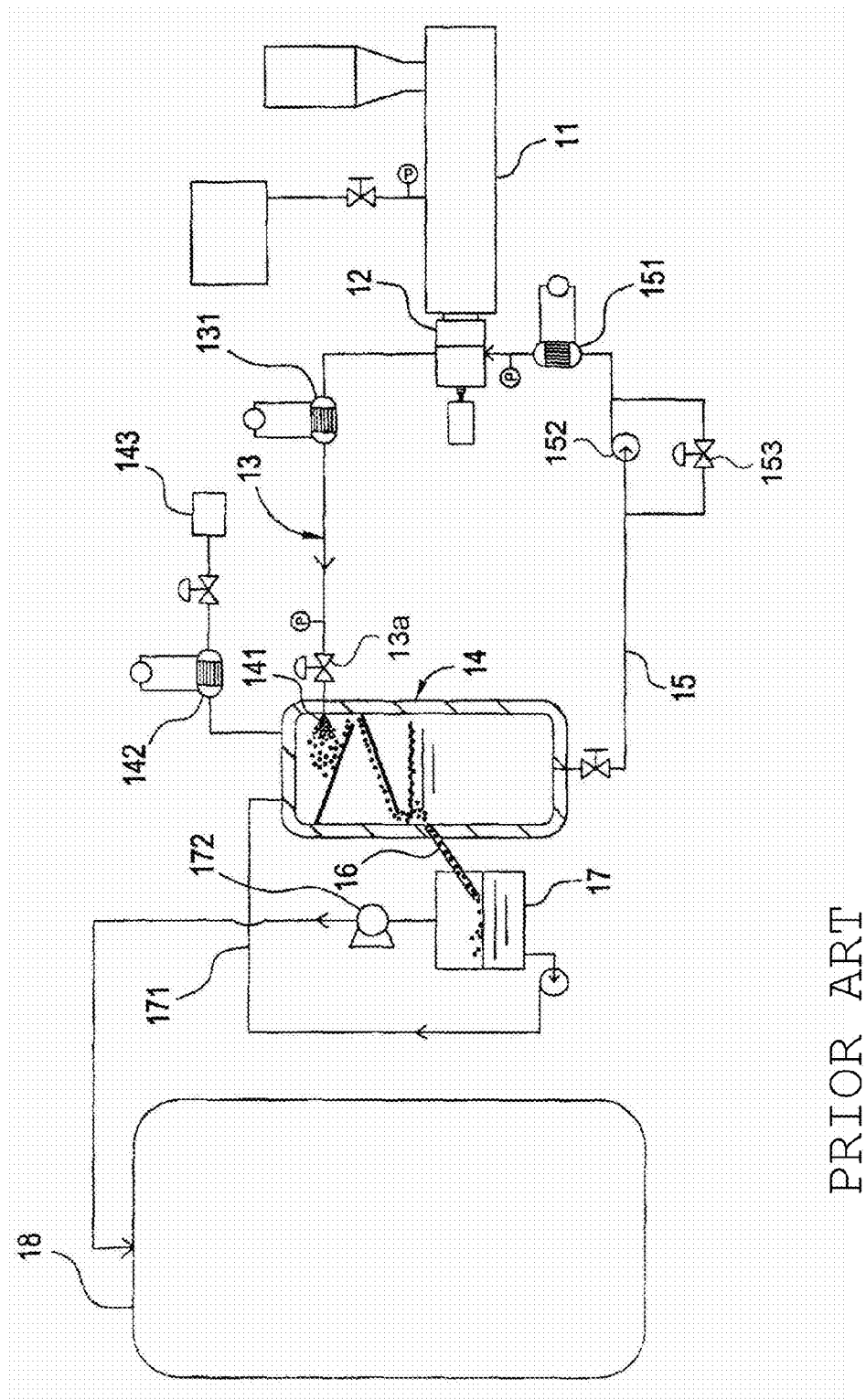
FIG. 2 is a schematic of another embodiment of a prior art system for extruding foamed thermoplastic pellets.

Referring to FIG. 2, another embodiment of a prior art system for extruding foamed thermoplastic plastic pellets is shown. A third temperature control device 131 is installed on the high temperature tube 13 connecting the high pressure underwater pelletizing machine 12 and foaming chamber 14. The third temperature control device 131 controls the liquid temperature inside high-temperature tube 13 to manipulate the size of the pellets in coordination with the pressure inside the high-temperature tube 13. Due to the better control of the liquid temperature in the high-temperature tube 13, the bubbles inside the foamed thermoplastic pellets are dense and small. In addition, the high temperature liquid can be nano liquid or other liquid, which is more viscous. The regular high-temperature liquid more readily blocks the nozzle, so by utilizing the higher viscosity of nano liquid, the liquid flow speed could be controlled and could eliminate the blockage phenomena at the nozzle.

Referring now to FIGS. 4-7, an extruder 11 and a high pressure underwater pelletizing machine 12 according to the present invention are shown. The extruder 11 includes an extrusion die 1 that contains the flow channel 10 in a body of the die that provides a path for the thermoplastic material to enter the pelletizing machine. The body is formed by upper and lower body members 2 and 3, respectively, which have semi-cylindrical cavities 21 and 31. There is at least one row of extruding holes 311 (broadly, "exit openings") inside the semi-circular cavity 31 of the lower cover body 3, which are directly attached to the extrusion die 1. The die also has channels connecting the extruding holes 311 with the flow channel 10 of the extrusion die 1. When the upper and lower body members 2 and 3 are connected together using suitable fasteners such as screws 9, a cylindrical space is formed to accommodate a cutter 4. The upper and lower body members 2 and 3 are attached to the extrusion die 1.

The cutter 4 has a series of grooves or flutes, each extending along a path that is a segment of a spiral and generally lengthwise of the cutter. Edges of the grooves cut the strands of thermoplastic material extruded from the respective extruding holes 311 of the lower body member 3 into pellets. The cutter 4 is located in the cylindrical space formed by the semi-circular cavities of upper 21, 31 and lower body members 2 and 3. The two, reduced diameter ends of the shaft of the cutter 4 are journalled in bearings 51 and 61 of the two holding structures 5 and 6. The holding structures 5 and 6 mount the bearings 51 and 61 in the centers of holding structures to hold ends of the cutter 4. The bearings 51, 61 having ribs 51a, 61a that engage the interior of the holding structures 5, 6 to locate the bearings and to provide passage for the high temperature liquid. Two cones 52 and 62 are mounted on outer ends of the bearings 51 and 61 to direct the water flow radially outwardly to the ribs 51a, 61a and around the cutter 4. The holding structures 5 and 6 are fixed to the sides of the upper and lower body members 2 and 3 with screws 9. The water-guiding structures 7 and 8 connect tube 71 for entering water and tube 81 for exiting water to the holding structures 5, 6. The two water-guiding structures 7 and 8 are attached the outer ends of holding structures 5 and 6 with screws 9.

Figure 6:
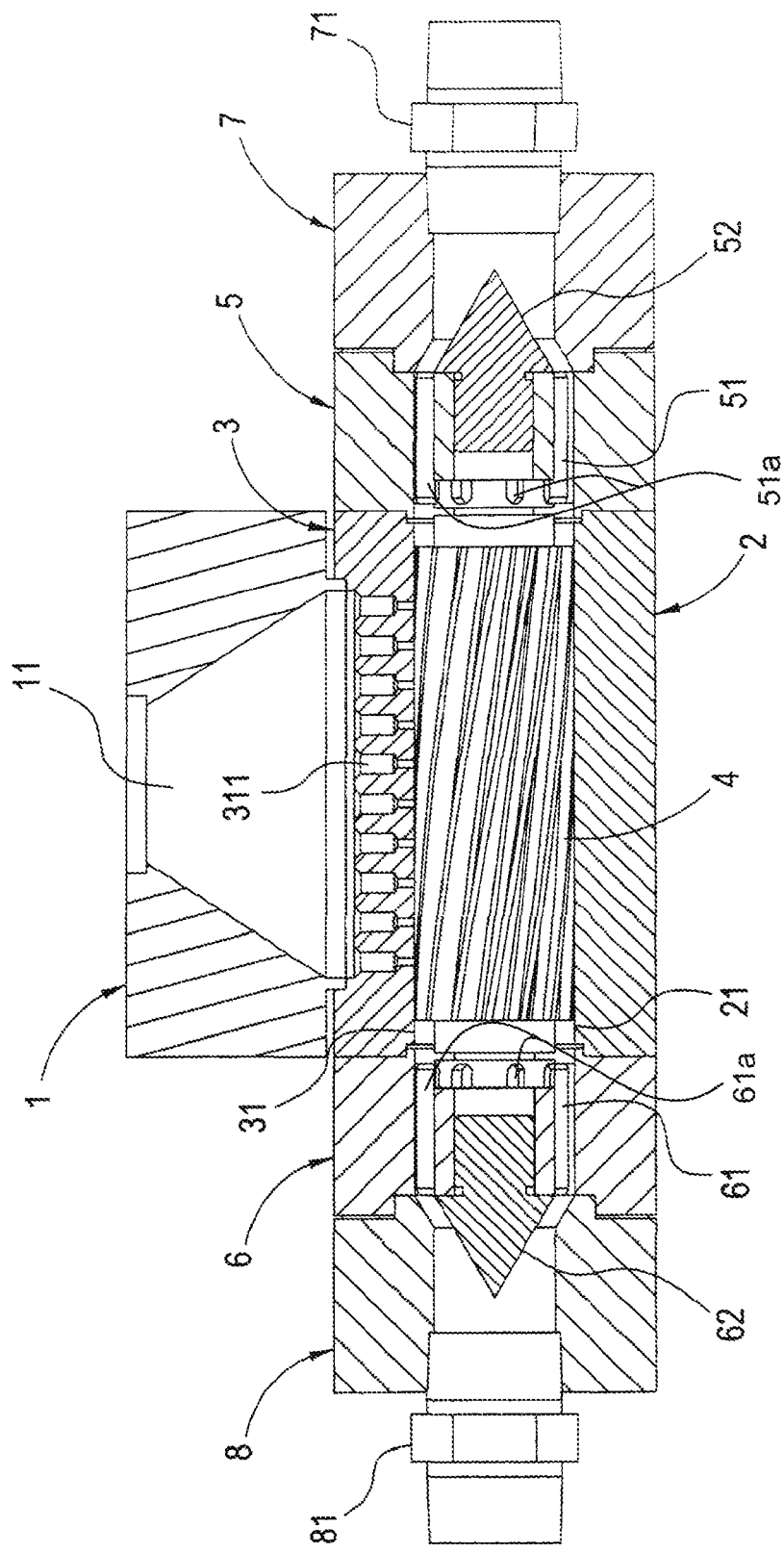
FIG. 6 is a section taken in the plane including line 6-6 of FIG. 5.
Figure 7:
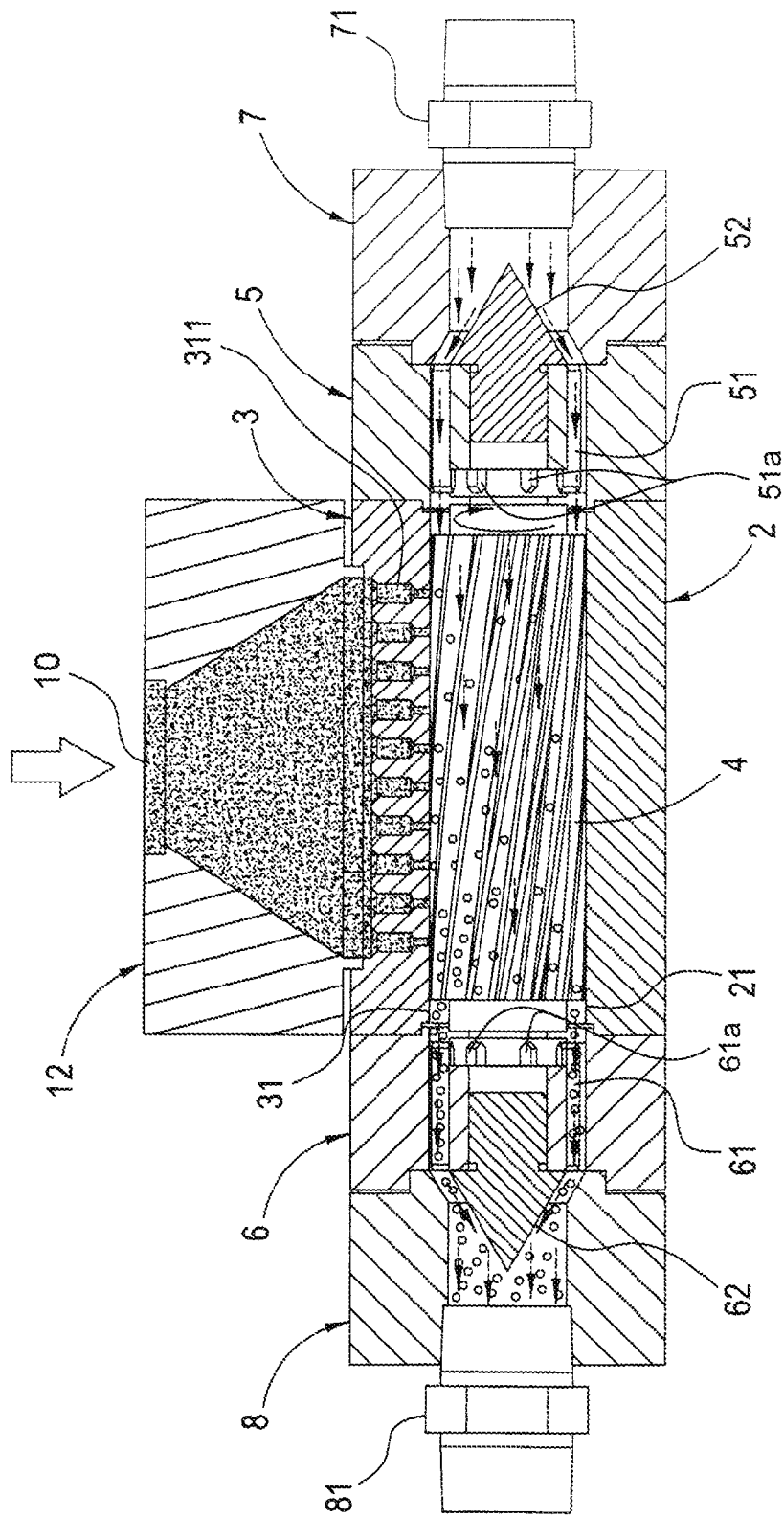
FIG. 7 is the section of FIG. 6 showing the underwater pelletizing machine in operation.

The high temperature liquid is directed from the heating device 151 to the underwater pelletizing machine through tube 71 of the water-guiding structure 7. The cone 52 of the holding structure 5 directs the high temperature liquid flowing through the space in between the ribs 51a of the support frame 51. The rapidly flowing high temperature liquid enters the grooves of the cutter 4, causing the cutter to rotate at high speed in the bearings 51 and 61 to perform the cutting process. Referring to FIGS. 6 and 7, when the thermoplastic material is extruded through the flow channel 10 of the extrusion die 1 to the multiple extruding holes 311 of the lower body member 3, the thermoplastic material is cut into pellets by the fast rotating cutter 4. The same high temperature liquid that causes rapid rotation of the cutter 4 also carries the thermoplastic pellets out of the pelletizing machine. The thermoplastic pellets flow through the space in between the ribs 61a of the support frame 61 of the holding structure 6 and exit the underwater pelletizing machine through tube 81 of the water-guiding structure 8. An external pressurizing system can be installed in the present invention to regulate the flow speed of the high temperature liquid in order to control the rotational speed of the cutter 4.

The cutter 4 in the improved underwater pelletizing machine of the present invention has the feature of cutting the pellets in a longitudinal direction. The rotation of the cutter 4 is driven by the flow of the high temperature liquid, which smoothes the cutting processes and does not generate turbulent flow. In addition, the rotation of the cutter is driven by the water flow, there is no need for electrical power, which reduces the electricity expense.

Figure 8:
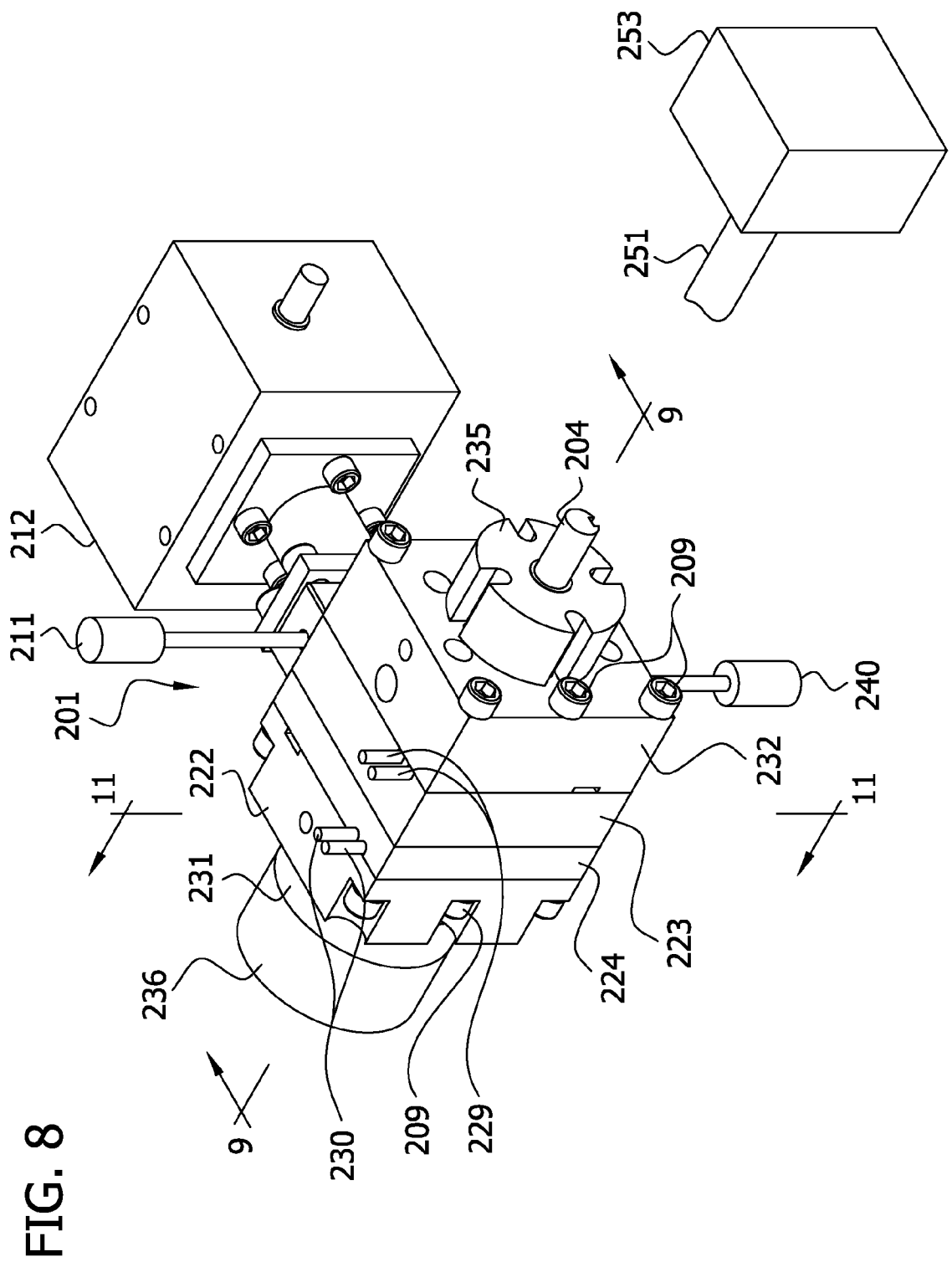
FIG. 8 is a perspective of a pelletizing machine of another embodiment.
Figure 9:
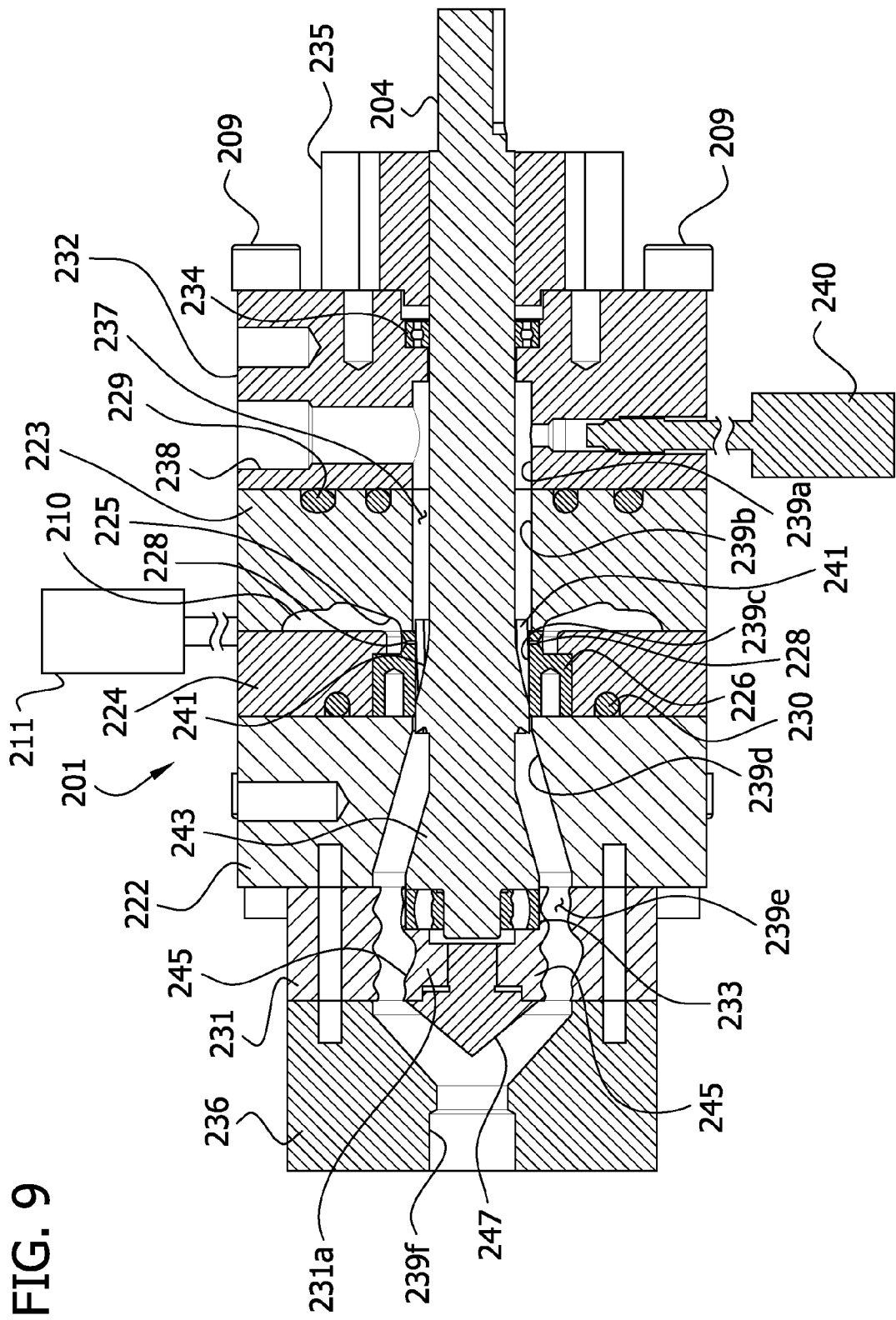
FIG. 9 is a section taken in the plane including line 9-9 of FIG. 8 with parts of outlet vanes broken away to reveal a flow path of liquid.
Figure 10:
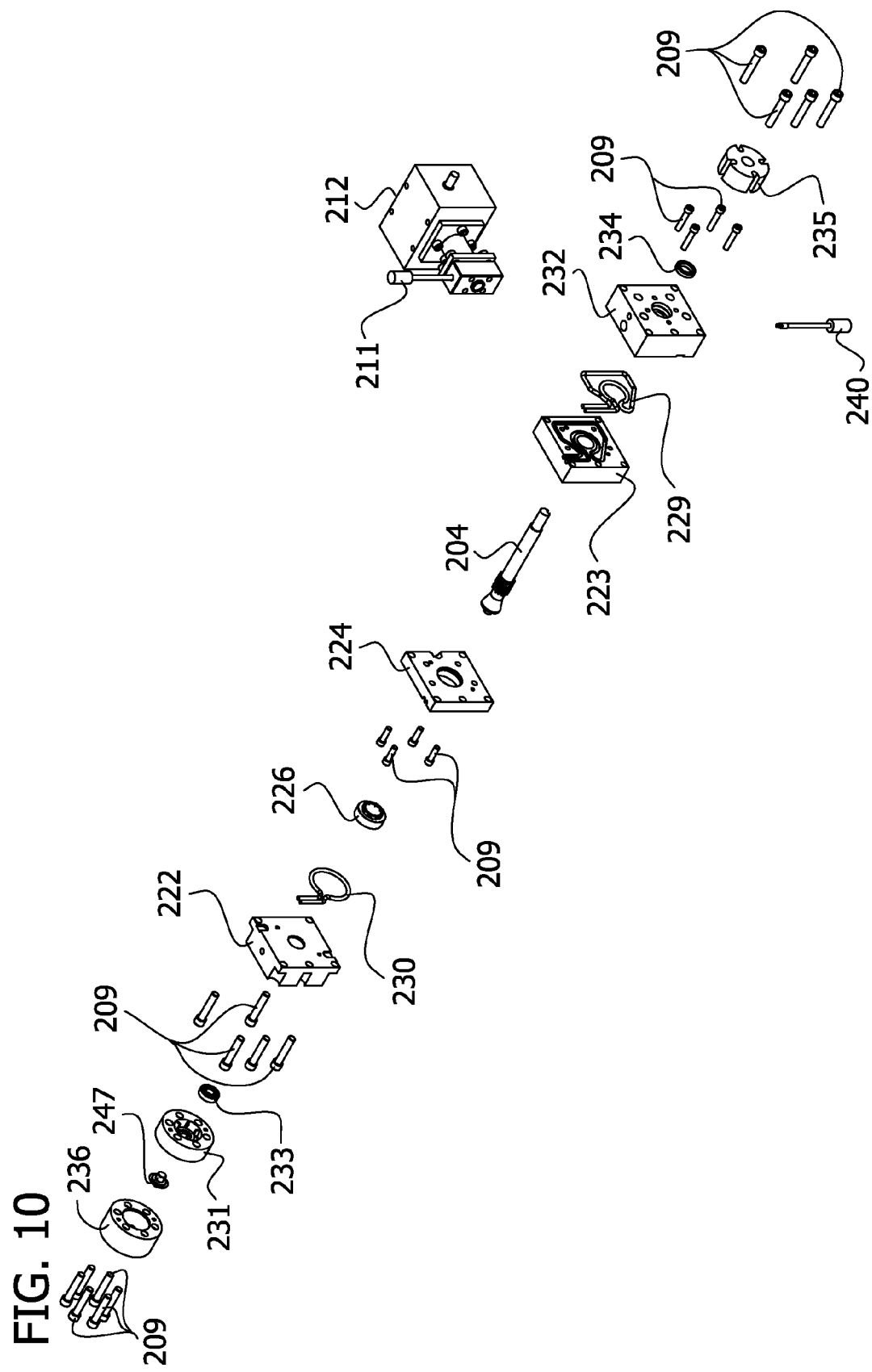
FIG. 10 is an exploded perspective of the pelletizing machine.
Figure 11:
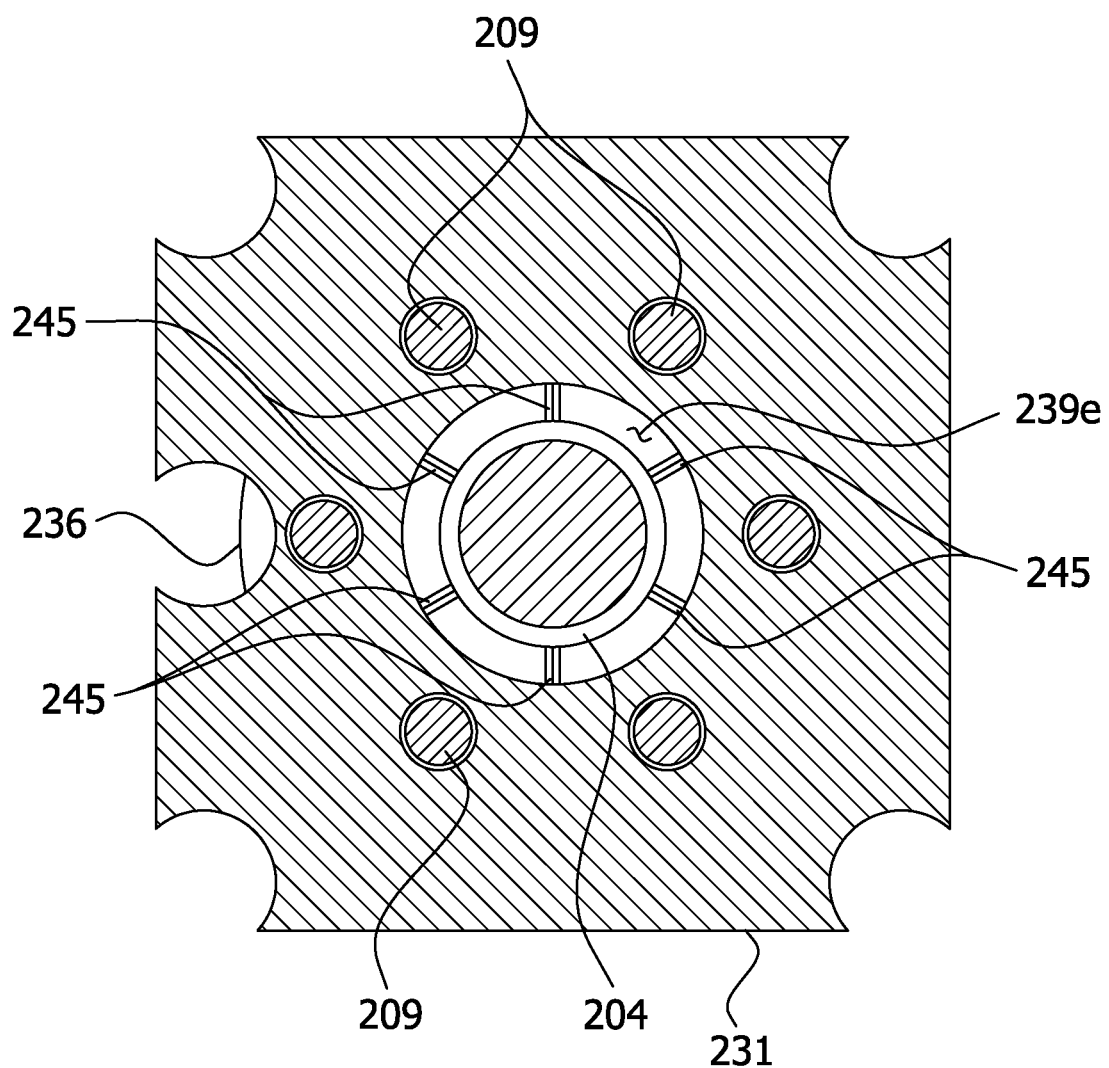
FIG. 11 is a section taken in the plane including line 11-11 of FIG. 8.

Referring now to FIGS. 8-14, a pelletizing machine of a second embodiment is shown to comprise a body 201 (including an extrusion die) having an internal flow channel 210, only portions of which are illustrated in the drawings (see, FIG. 9). The body 201 is connected to an extruder 212, gear pump or other suitable device (not shown). A pressure sensor 211 communicates with the flow channel 210 to read the pressure of the thermoplastic material. The body 201 includes multiple body members that are joined together in a suitable manner such as by fasteners 209. First and second body members, designated 222 and 223, respectively, sandwich a manifold holding member 224 between them. The second body member 223 defines a portion of the flow channel 210 including an annular flow channel section 225 that opens toward the manifold holding member 224 (see, FIGS. 9 and 14). The manifold holding member 224 holds an annular injection manifold 226 having an axially projecting flange 227 having injection ports 228 (broadly, "exit ports") extending radially through the flange at equal circumferentially spaced locations around the flange (see, FIGS. 9 and 13). Different spacings of the injection ports are possible within the scope of the present invention. Thermoplastic material mixed with foaming agent is formed through the flow channel 210 and through the injection ports 228. Heating tubes 229 and 230 are received in recesses in the second body member 223 and the manifold holding member 224 (respectively) heat the second body member and manifold holding member to maintain the molten, flowable state of the thermoplastic material in the body 201 at the location where it is extruded.

Referring still to FIG. 9, the body 201 further includes holding members 231, 232 located on opposite sides of the first and second body members 222, 223 and are connected to the body members by the fasteners 209. The holding members 231, 232 mount bearings 233, 234 supporting a cutter 204 for rotation about a longitudinal axis of the cutter. The bearings 233, 234 are preferably bearings, such as ceramic or stainless steel bearings, suitable for operation in a high temperature and pressure environment. The bearing 233 receives a reduced-diameter end of the cutter 204, and the bearing 234 receives the cutter entirely through the bearing on its way out of the body. A gland 235 is received around the cutter 204 and seals against the holding member 232. An outlet member 236 is attached to the holding member 231 opposite the first body member 222.

The members 222, 223, 224, 231, 232, 236 of the body 201 collectively define a liquid flow path along which the high temperature liquid flows through the body. The liquid flow path includes a cutting chamber 237 in which the extruded thermoplastic material is cut into pellets. An inlet 238 of the liquid flow path is formed in the holding member 232 and receives heated liquid under pressure into the body 201. The inlet 238 extending in a generally radial direction of the holding member 232 and intersects a generally axial opening 239a through the second body member. The gland 235 seals the axial opening 239a on the outside of the holding member 232 through which the cutter 204 extends out of the body 201. The axial opening 239a is aligned with corresponding axial openings 239b-239f in the second body member 223, manifold holding member 224 and injection manifold 226, first body member 222, holding member 231 and outlet member 236. The axial opening 239c includes coaxial openings in both the holding member 224 and the injection manifold 226. The axial openings 239a-239f extend through the body 201 to define a flow path for the liquid that is parallel to or coincident with an axis of rotation of the cutter 204. A pressure sensor 240 mounted in an opening in the holding member 232 is able to detect the pressure of the liquid coming into the body 201.

The axial openings 239b, 239c, 239d define the cutting chamber 237 in the illustrated embodiment. These axial openings 239b-239d receive parts of a cutting portion of the cutter 204 having flutes 241 formed by spiral grooves in the cutter. The axial opening 239d (also referred to as "a diverging portion") in the first body member 222 has an outwardly flaring diameter, and the cutter 204 has a corresponding outwardly flaring diameter portion 243 in registration with the axial opening. The surfaces defined by the axial opening 239d and the cutter portion 243 guide the liquid and pellets carried by the liquid radially outwardly in addition to transporting in through the body 201 so that the liquid may smoothly pass around the bearing 233 rotatably mounting the end of the cutter 204. The bearing 233 is held in a central portion 231a of the holding member 231 that is connected to radially outer portions of the holding member by circumferentially space vanes 245 (see, FIG. 11). The vanes split the axial opening 239e into several passages around the bearing 233 for flow of liquid and pellets. Downstream of the bearing 233, the flow path converges due to the decreasing diameter of part of the axial opening 239f in the outlet member 236 in the downstream direction. The axial opening 239f converges to a smaller diameter portion suitable for connection to a conduit (not shown). A cone 247 mounted on the central portion 231a of the holding member 231 provides a surface generally parallel to the decreasing diameter portion of the axial opening 239f The shapes of the cone 247 and the decreasing diameter portion of the axial opening 239f facilitate smooth flow of liquid through the radial transition and inhibits turbulence in the flow.

Figure 12:
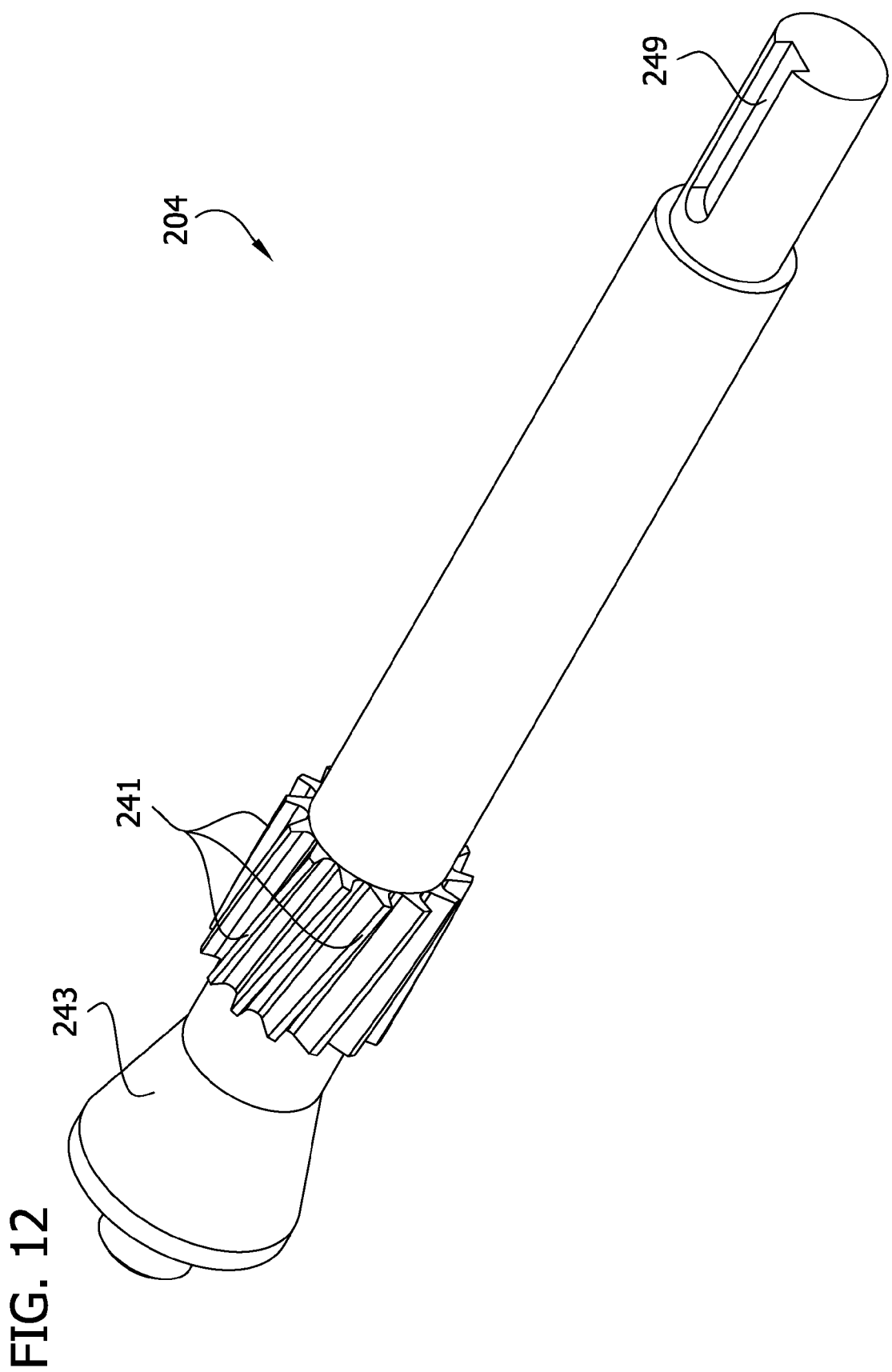
FIG. 12 is an enlarged perspective of a cutter of the pelletizing machine.
Figure 13:
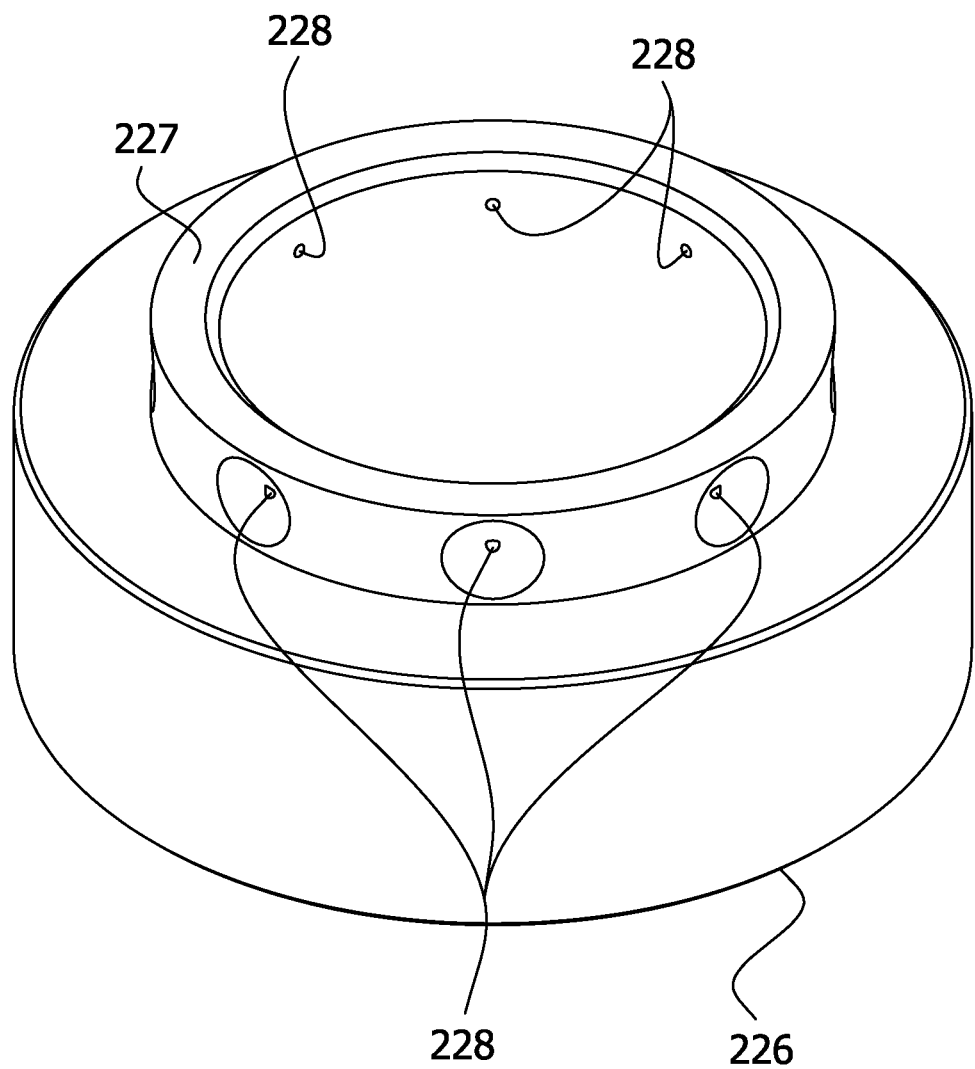
FIG. 13 is a perspective of an injection manifold of the pelletizing machine.
Figure 14:
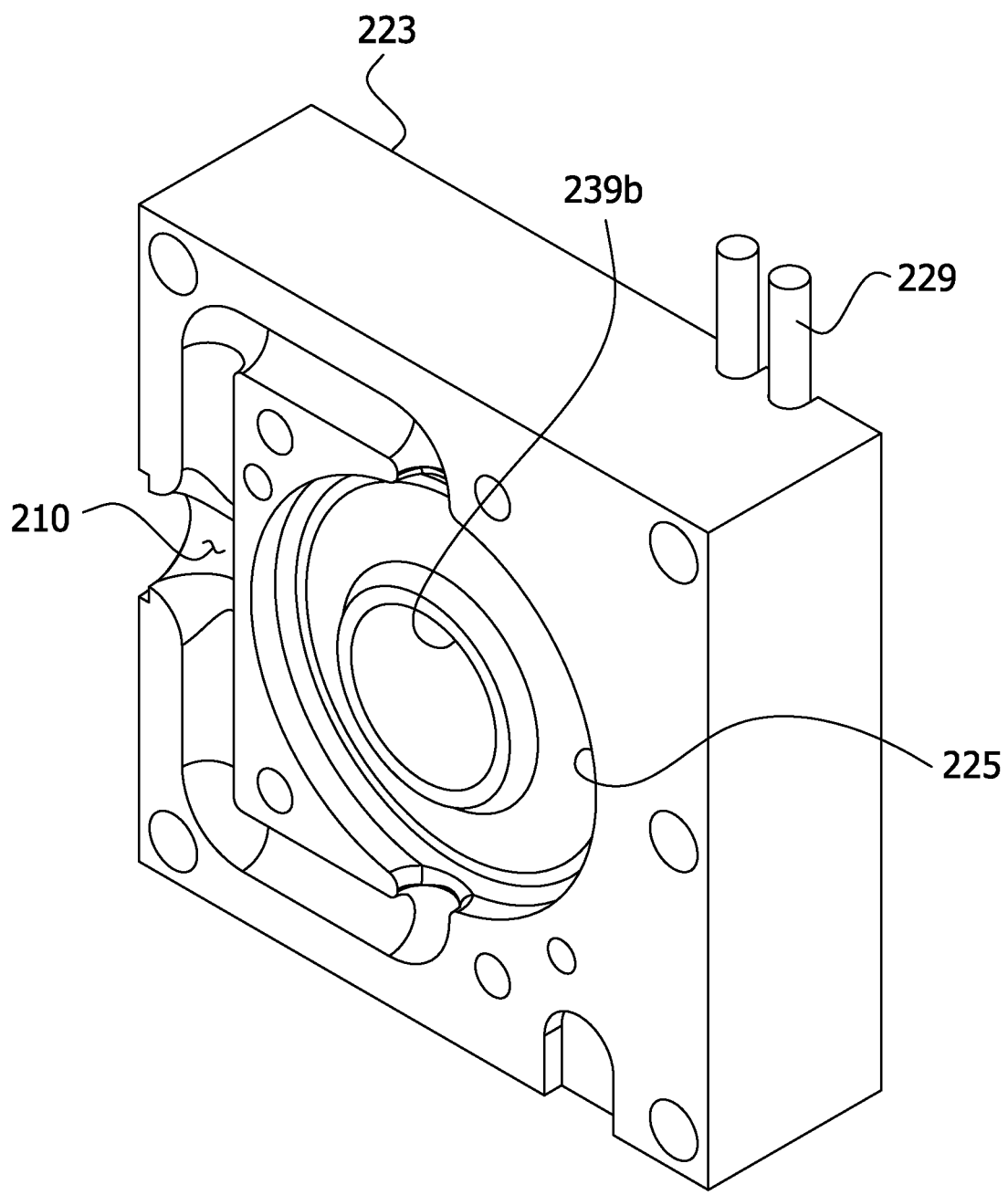
FIG. 14 is a perspective of a holder for the injection manifold.

Referring now to FIG. 12, the flutes 241 of the cutter 204 are generally curved so that they extend along a segment of the spiral path. The radially outer edge of the flutes 241 also function as cutting edges to cut strands of extruded thermoplastic material coming out of the injector ports 228. The annular arrangement of the injector ports 228 allows the portion of the cutter 204 containing the flutes 241 to be confined to a relatively short axial extent of the cutter. It is to be understood that although the flutes 241 extend along a spiral path, they may extend in other configurations, including straight axially within the scope of the present invention. Moreover, while the configuration of the flutes 241 provides at last some rotation of the cutter 204 in the illustrated embodiment, the flutes need not interact with the flowing liquid to provide rotation. Still further, structure (not shown) capable of interacting with the flowing liquid to provide rotation of the cutter 204 could be separate from structure (not shown) that cuts the extruded thermoplastic.

The right end of the cutter 204 (as oriented in FIG. 12) is formed to have a reduced diameter and a key 249. The key allows the cutter to be connected to a shaft 251 of a motor 253 external to the body 201 (FIG. 8). The motor 253 drives rotation of the cutter 204 in the body 201, which is supplemented by the flow of the liquid over the flutes 241. The gland 235 seals with the portion of the cutter 204 passing out of the holding member 232 to allow rotation of the shaft while sealing the interior of the body 201 against leakage of the liquid.

Obviously numerous modifications and variations of the present invention are possible in light of the above teachings. It is therefore understood that within the scope of the appended claims, the invention may be practiced otherwise than as specifically described herein.

What is claimed is:

1. A method of extruding foamed thermoplastic plastic pellets, comprises the steps of:
   uniformly mixing thermoplastic material and foaming agent;
   extruding the thermoplastic material mixed with the foaming agent to a high-pressure underwater pelletizing machine;
   forcing high temperature liquid at a high pressure over a cutter to rotate the cutter, said cutter being rotatable about an axis of rotation parallel to or coincident with a flow path of the forced high temperature liquid over the cutter;
   cutting extruded thermoplastic material mixed with the foaming agent into thermoplastic pellets by rotation of the cutter; and
   transporting the thermoplastic pellets out of the high-pressure underwater pelletizing machine using the high-temperature liquid in a direction parallel to the axis of rotation of the cutter, said transporting comprising delivering the thermoplastic pellets to a foaming chamber through a pressure drop device connected thereto and cooling the foamed thermoplastic pellets in the foaming chamber, said foaming chamber being connected to the high-pressure underwater pelletizing machine.

2. A method as set forth in claim 1 wherein extruding the thermoplastic material mixed with the foaming agent includes extruding the thermoplastic material mixed with the foaming agent into the pelletizing machine at an angle that is perpendicular to the axis of rotation of the cutter.

3. A method as set forth in claim 1 further comprising controlling the temperature of the pellets to below the softening point of the thermoplastic material at a location upstream of the pressure drop device to produces unfoamed pellets containing the foaming agent.

4. A method as set forth in claim 1 further comprising regulating the pressure drop across the pressure drop device to selectively control the amount of the foaming agent in the pellets.

5. A method as set forth in claim 1 further comprising carrying the thermoplastic pellets out of the foaming chamber by the flow of the low-temperature liquid to a separating unit.

6. A method as set forth in claim 1 further comprising condensing the steam of the high-temperature liquid with the temperature control device and collecting the foaming agent unused from the uniformly mixing step in a recycle tank from the condensed liquid.

7. A method as set forth in claim 1 further comprising transmitting low-temperature liquid in the foaming chamber to the high-pressure underwater pelletizing machine through a low-pressure tube connected to the bottom of the container.

8. A method as set forth in claim 7 further comprising heating the low-temperature liquid when being transported to the high-pressure underwater pelletizing machine.

* * * * *